United States Patent [19]

Yukuta et al.

[11] 3,960,980

[45] June 1, 1976

[54] METHOD OF PRODUCING ELASTOMER RESINS

[75] Inventors: Toshio Yukuta; Takashi Ohashi, both of Kodaira; Yoshiko Taniguchi, Higashi-Murayama; Masumi Saito, Tanashi, all of Japan

[73] Assignee: Bridgestone Tire Company Limited, Tokyo, Japan

[22] Filed: Dec. 16, 1974

[21] Appl. No.: 533,220

Related U.S. Application Data

[63] Continuation of Ser. No. 307,408, Nov. 17, 1972, abandoned.

[30] Foreign Application Priority Data

Nov. 22, 1971 Japan................................ 46-93785

[52] U.S. Cl................................ 260/835; 260/2 BP; 260/2 N; 260/78 SC
[51] Int. Cl.$^2$.................. C08G 45/06; C08G 45/12
[58] Field of Search........................ 260/835, 78 SC

[56] References Cited

UNITED STATES PATENTS

| | | | |
|---|---|---|---|
| 3,437,671 | 4/1969 | Sandler | 260/835 |
| 3,468,824 | 9/1969 | Williams | 260/830 R |
| 3,555,111 | 1/1971 | Benham | 260/830 R |

*Primary Examiner*—Murray Tillman
*Assistant Examiner*—T. Pertilla
*Attorney, Agent, or Firm*—Stevens, Davis, Miller & Mosher

[57] ABSTRACT

A flexible elastomer resin having an improved impact resistance and strength is produced by reacting an acid anhydride group functional polymer, which is prepared by reacting a hydroxyl group functional polymer having a number average molecular weight of 400 to 10,000 and containing at least two hydroxyl groups at the end or the side chain with a tricarboxylic acid anhydride monohalide, with at least one nitrogen compound having polyfunctional active hydrogens and at least one epoxy resin having at least one epoxy group.

7 Claims, No Drawings

METHOD OF PRODUCING ELASTOMER RESINS

This is a continuation of application Ser. No. 307,408 filed Nov. 17, 1972, now abandoned.

The present invention relates to a method of producing elastomer resins having a high elasticity and fluidity and an improved processability, which can be easily formed into a shaped article by pouring, injection molding, extrusion molding or compression molding, by using a functional polymer.

More particularly, the present invention relates to a method of producing elastomer resins having a high elasticity, which comprises reacting at least one of acid anhydride group functional polymers having the following formula

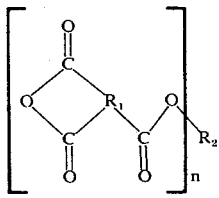

wherein $R_1$ is a trivalent group having at least two carbon atoms, $R_2$ is a hydroxyl group functional polymer residue and $n$ is an integer of at least 2, which are prepared by reacting a hydroxyl group functional polymer having a number average molecular weight of 400 to 10,000 and containing at least two hydroxyl groups at the end or the side chain with a tricarboxylic acid anhydride monohalide, with at least one nitrogen compound having polyfunctional active hydrogens and at least one epoxy resin having at least one epoxy group.

A first object of the present invention is to provide a method of producing a novel elastomer having a flexibility, a low second order transition temperature, an improved low temperature characteristics, impact resistance and strength by introducing a soft component into an epoxy resin.

A second object of the present invention is to provide a novel elastomer resin having a block structure, in which soft component portions having a high elasticity due to acid anhydride group functional polymer residue and hard component portions having a high cohesive energy or a second order bonding strength due to polar groups of amide linkage or diacylhydrazine linkage with the aromatic nucleus and ester linkage adjacent to the amide or diacylhydrazine linkage are arranged alternately.

Recently, many studies concerning the synthesis and physical properties of block copolymers have been made. This is because the high polymers having various properties have been demanded, but the synthesis of novel high polymers having such properties has not been expected and therefore, it has been intended to modify already known high polymers. As the prior study of block copolymers, synthesis of thermoplastic rubber materials by the addition polymerization system and synthesis of polyurethane elastomers by the polyaddition reaction system have been well known. Particularly, the latter polyaddition reaction system is typical as a method for producing rubbery elastomers from liquid high polymer, and various prepolymer compositions and compounded compositions suitable for various molding processes, such as pouring, injection molding, extrusion molding and compression molding, have been proposed.

Epoxy resins have hitherto been used for adhesives and electrical parts as liquid polymer and it has been known that an epoxy resin having at least two epoxy groups in one molecule is cured by using di- or more functional acid anhydride or amine as a curing agent to form a three-dimensional structure. That is, it has been well known that a polyepoxy compound is cured by using carboxylic acid anhydride to prepare excellent shaped articles having high mechanical, thermal and electrical resistances. In general, epoxy resin cured products obtained by reacting an epoxy resin having at least two epoxy groups in the molecule with a curing agent, for example, polybasic carboxylic acids, such as oxalic acid, maleic acid, phthalic acid and the anhydrides thereof, are excellent in the electric property and heat resistance. Moreover, since generation of heat at the curing of epoxy resin is very little, epoxy resin is suitable for the production of large shaped articles, and is used widely. However, epoxy resin cured products are poor in the flexibility, and generally have an elongation of 1 to 10%, and are brittle. In order to obviate these drawbacks, various investigations have been made: For example, a method wherein diamines having a spiroacetal ring are used as a curing agent (Japanese Patent Application Publication No. 32,155/70 and No. 32,156/70), and a method wherein polyepoxy compounds having polydiene rings, or acid anhydrides are used as a curing agent (Japanese Patent Application Publication No. 39,182/70 and No. 9,477/71) have recently been disclosed. However, cured epoxy resins obtained in these methods have an elongation of at most 50% and are still insufficient to be used as an elastomer product in various fields.

The inventors have already succeeded in an improvement of poor flexibility of conventional epoxy resin by using a high polymer having a novel chain structure as the acid anhydride curing agent to expand the application field of the epoxy resin cured product (U.S. Pat. application Ser. No. 143,645, British Patent Application No. 14,826/71, German Patent Application No. P 2 124 128.1 and U.S. Pat. application Ser. No. 143,643, British Patent Application No. 14,827/71, German Patent Application No. P 2 124 187.2). The inventors further continued an investigation relating to the novel cured product of epoxy resin, and surprisingly found that tenacious elastomers having considerably improved physical properties, particularly high tear strength and tensile strength, can be produced with making generation of heat and heat shrinkage low at the curing stage by adding a low molecular weight acid anhydride, and provided a tenacious elastomer based on the discovery (U.S. Pat. application Ser. No. 245,661, British Patent Application No. 18,490/72 and German Patent Application No. P 2 219 502.4).

While, it has hitherto been known that when a tetracarboxylic acid di-anhydride or a tricarboxylic acid anhydride monohalide is reacted with a nitrogen compound having polyfunctional active hydrogens, such as diamine or dicarboxylic acid dihydrazide, to prepare a precursor, such as polyamide acid, and the precursor is subjected to a dehydration reaction and formed into a ring structure, a heat resistant high polymer known as polyimide or polyimideamide can be produced. However, the heat resistant high polymer obtained by those methods is difficult to produce massive shaped articles and further the elasticity and flexibility are poor and in the course of the reaction, low molecular weight substances, such as water and the like, are split during the reaction and the resulting product can be used in thin layer articles, such as film, paint and the like, but is not substantially used in the field of elastomer.

The inventors have already disclosed several methods for improving the drawbacks of conventional epoxy resins as described above. Further, the inventors have considered that when the reaction of epoxy resin and acid anhydride, and the reaction of acid anhydride and nitrogen compound having active hydrogens, such as amine, which is predominantly used for the production of heat resistant polymers, such as polyimide resin and the like, are combined, a novel elastomer may be produced. That is, when a functional polymer having acid anhydride groups at the both ends or the side chain of the high molecular weight chain structure is reacted with a nitrogen compound having polyfunctional active hydrogens by a conventional method to form amide linkages and to extend chain, and the resulting carboxyl groups in the side chain are reacted with a epoxy resin having at least one epoxy groups, a curing reaction is caused and a cured product having improved flexibility and impact resistance in which the previous chain extending reaction and the curing reaction are introduced is obtained. It has never been hitherto known that side chain carboxyl groups formed by the reaction of acid anhydride groups with amine and the like are further subjected to a cross-linking reaction to cause a curing reaction and to produce an elastomer resin. In the above described reaction, an acid anhydride group functional polymer is firstly reacted with a nitrogen compound having polyfunctional active hydrogens, and then reacted with an epoxy compound. While, when the acid anhydride group functional polymer is reacted with the nitrogen compound and the epoxy resin simultaneously, it is assumed that in addition to the network structure obtained by the above described reaction, a cured product having ester linkages formed by the reaction of the acid anhydride with the epoxy group, a cured product formed by the reaction of the epoxy group with the nitrogen compound having active hydrogens of amino group, are formed together. In the present invention, any of the above described mixing and adding processes may be used, but in view of clarifying the structure of the resulting elastomer, the former process, i.e., the process wherein a polymer having carboxyl groups in the side chain is firstly formed and then the polymer is reacted with an epoxy compound to effect cross-linking and curing, is described in detail for the sake of the explanation of the expected structure. Moreover, since elastomers having various network structures can be easily produced by controlling the chain length of the acid anhydride group functional polymer, the inventors have considered that the former process contributes to clarify the relationship between the structure and physical properties of the resulting elastomer, and investigated further the methods for producing such elastomer resins having the above described structure, and finally achieved the present invention.

The elastomer resin according to the present invention is produced in the following way. A hydroxyl group functional polymer having a number average molecular weight of 400 to 10,000 and containing at least two hydroxyl groups at the end or the side chain is reacted with a tricarboxylic acid anhydride monohalide at a temperature as low as possible in the presence of a solvent by using hydrogen halide acceptors, such as pyridine and the like, to prepare a linear polymer having at least two acid anhydride functional groups at the end or the side chain, then the linear polymer is reacted with a nitrogen compound having polyfunctional active hydrogens preferably in bulky state to open the acid anhydride groups and to prepare a polymer having carboxyl groups in the side chain, and then the resulting polymer is reacted with an epoxy compound to effect cross-linking and curing, whereby the carboxyl group in the side chain and the epoxy group are reacted to form ester linkages, and cross-linked and cured epoxy resin is obtained.

When a precursor having polyamide linkages or polydiacylhydrazine linkages formed by the reaction of an acid anhydride group functional polymer and a nitrogen compound having polyfunctional active hydrogens is reacted with an epoxy resin having epoxy groups, it has been considered that a reaction between the epoxy group and the amino hydrogen present in the amide linkage and diacylhydrazine linkage occurs. However, the reactivity between polyamide and epoxy compound has hitherto been considered to be very low, and when polyamide and epoxy resin are used as the adhesives, polyamide having terminal amino groups is cured with epoxy resin in most cases. However, in these adhesives, the epoxy is bonded strongly to the polyamide by physical bonding, and another compound having active hydrogen is further added to the reaction system as a curing agent of the epoxy resin (Japanese Patent Application Publication No. 15,636/61, No. 25,536/63, No. 1,874/65, No. 23,189/65 and No. 24,784/65). Further, a method for producing epoxy resins, wherein a salt of equimolar amounts of a polybasic carboxylic acid and a polyvalent amine, for example, a nylon salt is used as a curing agent, is disclosed (Japanese Patent Application Publication No. 7,458/66). However, all of these methods relate to resinous products having poor flexibility, and the elastomers having various excellent physical properties obtained by the method of the present invention cannot be obtained in these methods.

Moreover, the elastomer resin produced by the method of the present invention is more improved in the elongation and strength than the elastomer resin previously proposed by the inventors in U.S. Pat. Application Ser. No. 143,643, British Patent Application No. 14,827/71 and German Patent Application No. P 2 124 187.2. Further, it has been known that the use of a basic catalyst is required in order to proceed smoothly the ester linkage forming reaction between carboxyl group and epoxy group. However, according to the method of the present invention, the cross-linking reaction proceeds satisfactorily at a relatively low temperature in a short time without the addition of catalyst, and a cured product is obtained. This is presumably due to the reason that the carboxyl group is activated by the action of the amide group or a diacylhydrazine group present in the proximity of the same polymer chain. This is one of the merits of the present invention.

The compounds of the formula (I), which are acid anhydride group functional polymers to be used in the present invention, are prepared by reacting an excess molar amount of tricarboxylic acid anhydride monohalide of the formula

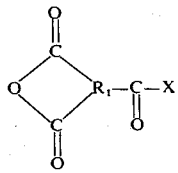 (II)

wherein $R_1$ is a trivalent group having at least two carbon atoms and X is a halogen atom, with a hydroxyl group functional polymer having a number average molecular weight of 400 to 10,000 and containing at least two hydroxyl groups at the end or the side chain and having the formula

HO—$R_2$—OH         (III)

wherein $R_2$ is a hydroxyl group functional polymeric residue, for example, according to the following reaction:

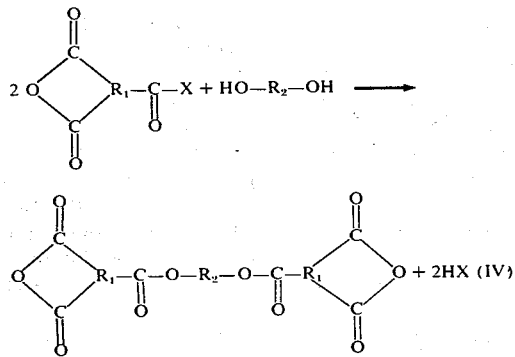

According to this method, hydrogen halide generates during the production of the acid anhydride group functional polymer, and the hydrogen halide is liable to considerably impede a reaction in a subsequent step and must be removed thoroughly. For this purpose, the reaction is preferably carried out in the presence of a hydrogen halide acceptor by using a solvent inert to both reactants.

Tricarboxylic acid anhydride monohalides to be used in the present invention are preferably expressed by the following formula

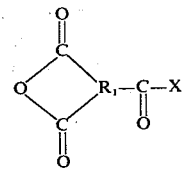 (II)

wherein $R_1$ is a trivalent group having at least two carbon atoms and X is chlorine, bromine, iodine or fluorine, usually chlorine. It is essentially possible to use any compounds defined in the above formula (II) and particularly, the use of aromatic compounds is preferable. In this case, $R_1$ represents a trivalent aromatic residue in which two carboxyl groups are separately bonded to adjacent carbon atoms so as to form a five-membered ring of acid anhydride group, and may be bonded to two carbon atoms in peri-position of naphthalene nucleus to form six-membered ring of acid anhydride group, and an acid halide group is preferably separated from the carbon atoms, to which the carboxyl groups of the acid anhydride group are bonded, by at least one carbon atom. In general, $R_1$ has the following structures:

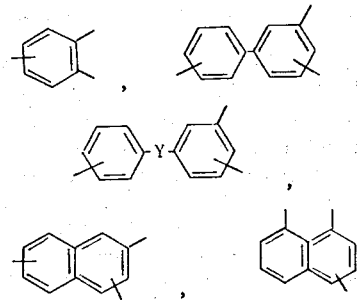

wherein Y is a hydrocarbon radical such as

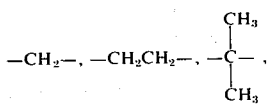

etc.; or
a group capable of bonding aromatic nuclei with each other and not substantially reacting with acid halide, acid anhydride or hydroxyl group functional polymer, such as —O—, —S—, —CO—, —SO$_2$—, —NH—, —COO—, —CONH—, and the like. Moreover, the said aromatic nuclei include those substituted with substituents not substantially reacting with acid halide, acid anhydride or hydroxyl group functional polymer, which substituents are, for example, lower alkyl group, phenyl group, halogen atom, alkoxy group, acyl group, acyloxy group, alkoxycarbonyl group, nitro group and the like.

As the compounds of the formula (II), mention may be made of trimellitic anhydride monohalide and monohalides of the following tricarboxylic acid anhydrides, e.g., 1,2,3-benzenetricarboxylic anhydride, 2,2',3-biphenyltricarboxylic anhydride, 3,4,4'-biphenyltricarboxylic anhydride, 3,4,4'-diphenylmethane tricarboxylic anhydride, 3,4,4'-diphenylether tricarboxylic anhydride, 3,4,4'-benzophenone tricarboxylic anhydride, 1,2,4-naphthalenetricarboxylic anhydride, 2,3,6-naphthalenetricarboxylic anhydride, 1,4,5-naphthalenetricarboxylic anhydride, 2,3,5-naphthalenetricarboxylic anhydride, 2-(3,4-dicarboxy phenyl)-2-(3-carboxy phenyl) propane anhydride, 2,3,5-pyrazinetricarboxylic anhydride, 2-(2,3-dicarboxy phenyl)-2-(3-carboxy phenyl) propane anhydride, 1-(2,3-dicarboxy phenyl)-1-(3-carboxy phenyl) ethane anhydride, 1-(3,4-dicarboxy phenyl)-1-(4-carboxy phenyl) ethane anhydride, (2,3-dicarboxy phenyl)-(2-carboxy phenyl) methane anhydride, and 3,3',4-tricarboxybenzophenone anhydride. Among them, trimellitic anhydride monohalide is preferable.

The hydroxyl group functional polymer to be used in the present invention may be an isolated compound or a reaction intermediate. The hydroxyl group functional polymer is prepared by ozonizing a high polymer having 2 to 100% by weight of olefinic unsaturated double bond in the main chain or side chain and then subjecting the resulting polymer ozonide to reduction and cleavage by means of a well-known reducing agent. As the starting material for the production of hydroxyl group functional polymer according to such an ozonolysis method, mention may be made of polybutadiene rubber, butadiene-styrene copolymer rubber, polyisoprene rubber, butadiene-acrylonitrile copolymer rubber, butadiene-acrylic ester copolymer rubber, ethylene-propylene-diene terpolymer rubber and the like. Furthermore, hydroxyl group functional polymers may be produced by radical polymerization, cation polymerization, anion polymerization, polyaddition or polycondensation process. Polyglycols having a number average molecular weight of from 400 to 10,000 and at least two hydroxyl groups, for example, polyolefin glycol, polyether glycol, polyester glycol and polyester ether glycol are employed for the production of acid anhydride group functional polymers to be used in the present invention. For instance, glycols obtained by synthesizing polydiene containing two lithium, potassium or sodium atoms at the ends according to a so-called living polymerization process and then treating the resulting polydiene with ethylene oxide or the like, or polydiene glycols obtained according to a radical polymerization process using hydrogen peroxide as an initiator can be used. Among them, polybutadiene glycol, polyisoprene glycol and the like are often used. Polyether glycols are obtained by using a compound containing at least two active hydrogen atoms as a base compound and reacting said compound with ethylene oxide, propylene oxide, butylene oxide or tetrahydrofuran or a mixture thereof according to an addition polymerization process. As the base compounds, use may be made of glycols, glycerine, trimethylol propane, 1,2,6-hexane triol, pentaerythritol, sucrose, glycose, sorbitol, ethylenediamine, novolak resin and the like. In addition to these compounds, polyethers obtained by homopolymerization of epichlorohydrin, styrene oxide or butadiene monoxide, or by copolymerization of these monomers with the above described epoxy compounds are used. Furthermore, a mixture of these polyethers can be used. Among these compounds, polyethylene glycol, polypropylene glycol, polytetramethylene ether glycol and the like are preferable. Hydroxypolyesters are generally prepared by the reaction of polybasic organic acids with polyols. The polybasic organic acids include oxalic acid, succinic acid, adipic acid, pimelic acid, azelaic acid, sebacic acid, maleic acid, fumaric acid, phthalic acid, isophthalic acid, dimer acid and the like. As polyols to be reacted with the polybasic organic acid, mention may be made of ethylene glycol, diethylene glycol, triethylene glycol, propylene glycol, butylene glycol, trimethylol propane, glycerine, hexane triol, sorbitol and the like. Polyesters having hydroxyl groups at the ends of the molecule are obtained by various combinations of these polybasic organic acids and polyols. Among the polyester glycols, polyethylene adipate glycol, polydiene ether adipate glycol and the like are preferable. The productions of polyether glycols and polyester glycols are described in "Polyurethane", 9th edition (1966), pages 31 to 57, coedited by Bridgestone Tire Co., Technical Headquarters and Nippon Trading Co., Planning Department, published by Maki Shoten; and J. H. Saunders and K. C. Frish, "High Polymers", Vol. 16, Polyurethanes: Chemistry and Technology, Part 1, pages 32 to 61, published by Interscience Publishers (1962). However, hydroxyl group functional polymers constituting a main chain structure of acid anhydride group functional polymer to be used in the present invention are not intended to be limited to the above mentioned embodiments.

According to the present invention, the hydroxyl group functional polymers must have at least two hydroxyl groups at the end or side chain as described above, and the polymer claim constituting said polymer has a number average molecular weight of from 400 to 10,000 preferably 1,000 to 6,000. These requirements will be further explained in detail below. When a large amount of aromatic comonomer such as styrene or acrylonitrile, or a comonomer rich in polar group is contained in the polymer chain, the fluidity of the resulting acid anhydride group functional polymer is poor and the processability is lowered, and also practical value lowers. Therefore, in order to obtain acid anhydride group functional polymers which are liquid or semi-solid at room temperature, it is necessary that the main chain skeleton constituting said polymer contains more than 50% by weight of portion bonded with aliphatic diene or ether linkage. Further, when the molecular weight of the hydroxyl group functional polymer is small, the proportion of the acid anhydride group occupied in the resulting acid anhydride group functional polymer becomes large, so that when curing is effected by using a reaction mixture containing such acid anhydride group functional polymer, the flexibility and bending resistance of the resulting elastomer resin are poor. While, when the molecular weight of the hydroxyl group functional polymer is large, the undesirable influence upon curing is low, but the viscosity of the polymer increases with the increase of the molecular weight and the processability is considerably poor. Accordingly, the molecular weight of the hydroxyl group functional polymer is limited to the above defined range.

The acid anhydride group functional polymer to be used in the present invention is prepared as follows. That is, solvents, which dissolve tricarboxylic acid anhydride monohalide and are not substantially reacted therewith, such as benzene, toluene, xylene, ethyl ether, tetrahydrofuran, chloroform and the like, are used, and the hydroxyl group functional polymer and the tricarboxylic acid anhydride monohalide are reacted at a temperature as low as possible, i.e., at 0° to 10°C in the presence of hydrogen halide acceptors, such as trimethylamine, triethylamine, tributylamine, pyridine, picoline, quinoline, dimethylbenzylamine, diethylbenzylamine, dimethylaniline, diethylaniline and the like. In this case, it is preferable that a solution of the tricarboxylic acid anhydride monohalide in the above described solvent is added dropwise to a solution of the hydroxyl group functional polymer and the hydrogen halide acceptor in the above described solvent. Then, hydrogen halide salt of tertiary amino compound is separated from the resulting solution containing a reaction product and thereafter the solvent is completely removed to obtain the acid anhydride group functional polymer having two or more of acid anhydride groups at the end or side chain.

In the production of elastomer resin according to the present invention, nitrogen compounds having polyfunctional active hydrogens are used and include aliphatic, alicyclic and aromatic amino compounds, and hydrazide compounds. As amino compounds, aliphatic, alicyclic and aromatic compounds may be used, but the use of aromatic diamines is preferable. The preferable aromatic diamines are represented by the following formula

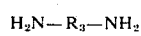  (V)

wherein R₃ is an aromatic residue. In this case, two amino groups are preferably bonded to carbon atoms which are not adjacent to each other, and similarly, in case of naphthalene nucleus, a compound wherein amino groups are bonded to two carbon atoms in peri-position is excluded. In general, R₃ has the following structures:

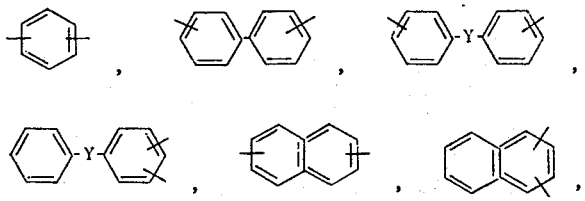

wherein Y is a hydrocarbon radical such as

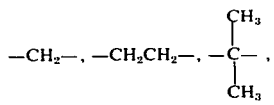

etc.; or
a group capable of bonding aromatic neuclei with each other, such as —O—, —S—, —CO—, —SO₂—, —NH—, —COO—, —CONH— and the like.

Moreover, the said aromatic neucleus includes those substituted with a substituent selected from the group consisting of lower alkyl group, phenyl group, halogen atom, alkoxy group, acyloxy group, alkoxycarbonyl group, nitro group, etc. In addition, polyether, polyester, polyurethane, polyamide, polydiene, which have terminal aromatic amino groups, and the like may be used.

As the aromatic diamines, mention may be made of m-phenylenediamine, p-phenylenediamine, chlorophenylenediamine, toluylenediamine, benzidine, o-tolidine, o-dianisidine, 4,4'-diaminodiphenylmethane, 4,4'-diaminodiphenyl-2,2-propane, 4,4'-diaminodiphenyl ether, 4,4'-diaminobenzophenone, 3,3'-diaminodiphenyl sulfone, 4,4'-diaminodiphenylamine, 3,3'-dichloro-4,4'-diaminodiphenylmethane, 3,3'-dimethyl-4,4'-diaminodiphenylmethane, 3,3'-dimethoxy-4,4'-diaminodiphenylmethane, 3,3'-dichlorobenzidine, 3,3'-diethoxy-4,4'-diaminodiphenylmethane, 3,3'-dicarboxy-4,4'-diaminodiphenylmethane, 3,3'-difluoro-4,4'-diaminodiphenylmethane, 3,3'-dibromo-4,4'-diaminodiphenylmethane, 3,3'-dihydroxy-4,4'-diaminodiphenylmethane, 3,3'-disulfo-4,4'-diaminodiphenylmethane, 3,3'-dimethyl-4,4'-diaminodiphenyl ether, 3,3'-dimethoxy-4,4'-diaminodiphenyl ether, 3,3'-diethoxy-4,4'-diaminodiphenyl ether, 3,3'-dicarboxy-4,4'-diaminodiphenyl ether, 3,3'-dichloro-4,4'-diaminodiphenyl ether, 3,3'-dihydroxy-4,4'-diaminodiphenyl ether, 3,3'-disulfo-4,4'-diaminodiphenyl ether, 3,3'-dimethyl-4,4'-diaminodiphenyl sulfone, 3,3'-dimethoxy-4,4'-diaminodiphenyl sulfone, 3,3'-diethoxy-4,4'-diaminodiphenyl sulfone, 3,3'-dicarboxy-4,4'-diaminodiphenyl sulfone, 3,3'-dichloro-4,4'-diaminodiphenyl sulfone, 3,3'-dihydroxy-4,4'-diaminodiphenyl sulfone, 3,3'-disulfo-4,4'-diaminodiphenyl sulfone, 3,3'-diemthyl-4,4'-diaminodiphenylpropane, 3,3'-dimethoxy-4,4'-diaminodiphenylpropane, 3,3'-diethoxy-4,4'-diaminodiphenylpropane, 3,3'-dicarboxy-4,4'-diaminodiphenylpropane, 3,3'-dichloro-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminodiphenyl sulfide, 3,3'-dimethoxy-4,4'-diaminodiphenyl sulfide, 3,3'-diethoxy-4,4'-diaminodiphenyl sulfide, 3,3'-dicarboxy-4,4'-diaminodiphenyl sulfide, 3,3'-dichloro-4,4'-diaminodiphenyl sulfide, 3,3'-dihydroxy-4,4'-diaminodiphenyl sulfide, 3,3'-disulfo-4,4'-diaminodiphenyl sulfide, 3,3'-diaminodiphenylmethane, 3,3'-diaminodiphenyl ether, 3,3'-diaminodiphenyl sulfide, 3,3'-dimethyl-4,4'-biphenyldiamine, 3,3'-dimethoxybenzidine, 1,4-diaminonaphthalene, 1,5-diaminonaphthalene, 2,6-diaminonaphthalene, polyol and polyamide containing amine in the end, and the like. Among them, 3,3'-dichloro-4,4'-diaminodiphenylmethane, 4,4'-diaminodiphenyl ether and the like are preferable. These aromatic diamines may be used alone or in admixture. The aliphatic and alicyclic amino compounds have usually a high reactivity and are liable to cause an undesirable side reaction with the generation of heat, so that they are desirable to be used together with the aromatic amino compound, if possible. These amino compounds include hydrazine, ethylenediamine, propylenediamine, tetramethylenediamine, pentamethylenediamine, hexamethylenediamine, nonamethylenediamine, m-xylylenediamine, p-xylylenediamine, 3,9-bis(3-aminopropyl)-2,4,8,10-tetraoxaspiro[5,5]undecane, 1,3-cyclohexyldiamine, 1,4-cyclohexylidinamine and the like.

As hydrazide compounds, aliphatic, alicyclic and aromatic dicarboxylic acid dihydrazides are used. The dicarboxylic acid dihydrazide usually has 2 to 20 carbon atoms and includes, for example, oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, cyclohexamedicarboxylic acid dihydrazide, phthalic acid dihydrazide, isophthalic acid dihydrazide, terephthalic acid dihydrazide, naphthalene dicarboxylic acid dihydrazide, so-called dimer acid dihydrazide, oxaveleric acid dihydrazide, tetradecane dioic acid dihydrazide, decamethylene dicarboxylic acid dihydrazide brassylic acid dihydrazide, octadecane-1,18-dicarboxylic acid dihydrazide, eicosane-1,20-dicarboxylic dihydrazide, piperazine dicarboxylic acid dihydrazide, 3,9-bis(2-hydrazide ethyl)-2,4,8,10-tetraoxaspiro[5,5]undecane and the like, and these compounds may be used alone or in admixture. Compounds having amino group and carboxylic acid group, e.g., m-aminobenzoic acid hydrazide and p-aminobenzoic acid hydrazide are also used. Further, compounds having a comparatively low melting point, such as carbohydrazide, are excellent in the processability and are preferably used. Among these compounds, adipic acid dihydrazide, sebacic acid dihydrazide, isophthalic acid dihydrazide, carbohydrazide or 3,9-bis(2-hydrazide ethyl)-2,4,8,10-tetraoxaspiro[5,5]undecane is often used.

Furthermore, in addition to the above described difunctional amino compounds or hydrazide compounds, polyfunctional amino compounds or hydrazide compounds may be used, but in this case these compounds must be ones which can prevent the rapid formation of three dimensional structure by adjusting the amount ratio when these compounds are previously reacted with the acid anhydride group functional polymers. As these compounds use may be made of melamine and trimesic acid trihydrazide which are relatively low in the reactivity and the like. When these compounds are reacted with the acid anhydride group functional polymer and the epoxy resin simultaneously, the above described limitation is not necessary and triaminobenzene, diaminobenzidine and the like may be used.

The epoxy resins to be used in the method of producing the elastomer resins of the present invention are as follows. Namely, any epoxy resins which contain at least one epoxy group and have such a boiling point that the epoxy resins do not volatilize upon the heat curing, may be used, and for example, the resins containing one epoxy group involve styrene oxide, butadiene monoxide, epoxy stearate and the like. The particularly preferred resins contain two or more epoxy groups and generally are epoxy resins to be used for the epoxy resin cured products. As these epoxy resins, mention may be made of glycidyl ethers of polyhydric phenols, such as bisphenol A, resorcinol, hydroquinone, pyrocatechol, saligenin, 4,4'-dihydroxy-diphenyl, 1,5-dihydroxy-naphthalene, dihydroxy-diphenyl sulfone and the like and glycidyl ethers of polyhydric alcohols, such as ethylene glycol, propylene glycol, glycerine and the like. Furthermore, diene polymers, polyether polymers and polyester polymers containing two or more epoxy groups at the end or the side chain may be used. These compounds are, for example, 1,2-bis(2,3-epoxypropoxy)ethane, 1,3-bis(2,3-epoxypropoxy)propane, 1,3-bis(2,3-epoxypropoxy)butane, 2,2'-bis(2,3-epoxypropoxy)diethyl ether, 2,4-bis(2,3-epoxypropoxy)pentane, 1,5-bis(2,3-epoxypropoxy)2,3,4,5-tetraoxyhexane, 1,6-bis(2,3-epoxypropoxy)-hexane, 1,5-bis(2,3-epoxypropoxy)pentane, 2,5-bis(2,3-epoxypropoxy)-hexane, 1,2-bis(2,3-epoxypropoxy)benzene, 1,3-bis(2,3-epoxypropoxy)benzene, 1,4-bis(2,3-epoxypropoxy)benzene, 4,4'-bis(2,3-epoxypropoxy)biphenyl, 4,4'-bis(2,3-epoxypropoxy)diphenylmethane, 4,4'-bis(2,3-epoxypropoxy)diphenyl-2,2-propane, 4,4'-bis(2,3-epoxypropoxy)-3,3'-dimethyldiphenyl-2,2-propane, 4,4'-bis(2,3-epoxypropoxy)diphenyl-2,2-butane, 4,4'-bis(2,3-epoxypropoxy)-diphenyl-1,1-ethane, 4,4'-bis (2,3-epoxypropoxy)-diphenyl-1,1-butane, 4,4'-bis(2,3-epoxypropoxy)tetraphenylmethane, 4,4'-bis(2,3-epoxypropoxy)-2,2',6,6',-tetra-tert.-butyldiphenylmethane, 4,4'-bis(2,3-epoxypropoxy)-3,3',5,5'-tetra-tert.butyldiphenylmethane, 2,4-bis(2,3-epoxypropoxy)diphenylemthane, 1,5-bis(2,3-epoxypropoxy)naphthalene, 1,8-bis(2,3-epoxypropoxy)-naphthalene, 2,6-bis(2,3-epoxypropoxy)-naphthalene, 2,7-bis(2,3-epoxypropoxy)naphthalene and the like.

The epoxy resin derived from bis-phenol A further includes ones having the following general formula

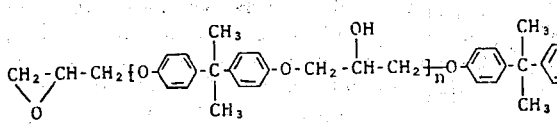

wherein $n$ is an integer showing the molecular weight of this compound in the case of epoxy equivalent of 100 to 4,000.

Further, as the alicyclic epoxy resins, epoxy resins having cyclohexene oxide structure, dicyclopentadiene oxide structure and structures derived therefrom may be used. As the epoxy resin having at least three epoxy groups, use may be made of tris-2,3-epoxypropoxy isocyanurate type and Novolak type epoxy resins. However, the epoxy resins to be used in the present invention are not limited to the above described embodiments. Moreover, in the present invention, the above described epoxy resins can be used alone or in admixture of two or more compounds, and epoxy resins derived from bis-phenol A is preferred.

The novel highly elastic elastomer resin according to the present invention prepared by using the fluid functional polymer may be added with fillers, whereby physical properties of the elastomer resin can be improved. The fillers are not particularly limited, and fillers used in the production of usual epoxy resin cured products, such as asbestos, silica, powdery metal, etc., and fillers generally used in the compounding of rubber, such as carbon black, zinc white and the like, can be used depending upon the use purpose.

Furthermore, when low molecular weight acid anhydrides having a molecular weight of less than 400 are added to the above described elastomer resin, physical properties, particularly tensile strength and tear strength of the elastomer resin can be improved. Embodiments of the low molecular weight acid anhydrides having a molecular weight of less than 400 are aliphatic, alicyclic and aromatic carboxylic acid anhydrides. Embodiments of acid anhydrides having one acid anhydride group are maleic anhydride, tetrahydrophthalic anhydride, hexahydrophthalic anhydride, methyl-tetrahydrophthalic anhydride, succinic anhydride, adipic anhydride and the like. Among them, phthalic anhydride and hexahydrophthalic anhydride are particularly preferable. The compounds having one acid anhydride group and carboxylic group are trimellitic anhydride and tricarballic anhydride, etc. The embodiments having two acid anhydride groups are pyromellitic anhydride, benzophenone tetracarboxylic anhydride and the compounds shown by the general formula

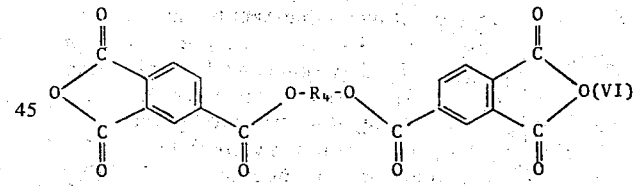

wherein $R_4$ is $(CH_2)_2$, $(CH_2)_4$, $(CH_2CH_2)_2O$, $$CH_2-\langle\rangle-CH_2$$

or $$CH_2-\langle\rangle-CH_2$$

for example, ethylene glycol bistrimellitate, xylylene glycol bistrimellitate, etc.

The embodiments having three acid anhydride groups are glycerinetristrimellitate, etc. However, the low molecular weight acid anhydride having a molecular weight of less than 400 to be used in the present invention are not limited to the above described compounds and may be used alone or in admixture of two or more compounds. A major part of the acid anhydrides are solid or crystal and when it is difficult to mix with the epoxy resin and a high temperature is necessary, the acid anhydrides are preferably used as eutectic mixture so as to make the solid or crystal to a liquid state at room temperature.

The adding and mixing order of the starting materials and/or various additives, that is the acid anhydride group functional polymer, nitrogen compound having polyfunctional active hydrogens, epoxy resin, fillers, low molecular weight acid anhydride and catalyst may be optional but it is preferred that the acid anhydride group functional compound and the nitrogen compound having polyfunctional active hydrogens are thoroughly and homogeneously mixed, after which when the nitrogen compound has a melting point, the mixture is heated to a temperature near the melting point and the homogeneous reaction is effected and then the epoxy resin and the other additives are added. This process may be carried out in the presence of a solvent. The amounts of these components to be used may be determined depending upon the object. In general, it is advantageous to select the amount ratio of the reactants so that the reactants are equivalent against the reactive groups but it is possible to select said ratio to be beyond the stoichiometric amount. According to the present invention, the curing can be effected sufficiently without using catalyst, and tenacious elastomer resins having a three-dimensional structure can be obtained, which is one of the merits of the present invention. However, catalysts may be used in order to accelerate the curing, and any catalyst which accelerates the reaction of epoxy group with carboxyl group or with acid anhydride group can be used. For example, tert.-amine series basic catalysts, such as pyridine, dimethylbenzylamine, 2-(dimethylaminomethyl)-phenol, 2,4,6-tris(dimethylaminomethyl)-phenol and salts thereof, can be used.

The mixing and compounding process of the above described components to be used in the method of the present invention will be explained more concretely. Predetermined amounts of an acid anhydride group functional polymer and a nitrogen compound having active hydrogens are mixed under stirring at a temperature higher than the melting point of the nitrogen compound, i.e. generally at a temperature of 40 to 200°C to prepare a homogeneous precursor, and then the precursor is kept at a temperature of from room temperature to 150°C, and added with an epoxy resin and further with a catalyst, various additives, a filler, etc. depending upon the purpose, after which the resulting mixture is stirred and mixed thoroughly, subjected to defoaming under vacuum, injected into a mold and cured, whereby an elastomer can be easily obtained. The curing condition can be determined optionally, and the object of curing can be attained satisfactorily by carrying out at a temperature of 100° to 200°C for 1 to 5 hours.

The elastomer resin produced by the method of the present invention is a novel substance having an improved elongation and tenacity, which cannot be attained in the conventional epoxy resin cured products. Moreover, since the elastomer resin contains amide linkages and diacyl hydrazide linkages, which serve to make the polymer heat resistant, the resin is excellent in the heat stability, and furthermore since the resin has a large amount of the second order bonding ability, such as hydrogen bond, the resin is particularly excellent in the tenacity and adhesion. Accordingly, the use of the elastomer resin of the present invention is very wide as compared with that of the conventional elastomers. For example, the elastomer resin can be used in synthetic rubber, coating materials, electric insulating materials, materials for civil works, building materials, and adhesives.

The following examples are given in illustration of this invention and are not intended as limitations thereof. In the examples, "part" and "%" mean weight basis unless otherwise specified.

EXAMPLE 1

Into a four neck separable flask of 100 ml capacity equipped with a stirrer driven by a motor and connected to nitrogen line and a vacuum pump were charged 20.45 g of a trimellitoyl group functional polymer, which was prepared from polytetramethylene ether glycol having a number average molecular weight of 1058 (made by Nippon Polyurethane Kogyo Co.) and trimellitic anhydride monochloride in an equivalent ratio of the functional groups of both components of 1:1 by using benzene as a solvent and pyridine as a hydrogen chloride acceptor, and 3.34 g of 3,3'-dichloro-4,4'-diaminodiphenylmethane (the equivalent of the amino group per 1 equivalent of the acid anhydride group is 1). The resulting mixture was stirred under nitrogen atmosphere in an oil bath kept at 80°C. The two components were homogeneously mixed and melted, and the viscosity of the system was gradually increased. The oil bath temperature was raised up to 150°C and stirring was further continued for about 20 minutes at this temperature to obtain a fluid reaction mass. A small amount of the reaction mass was sampled on a potassium bromide crystal plate and an infrared absorption spectrum of the mass was measured. The infrared absorption spectrum showed that the absorption at 1,850 cm$^{-1}$ assigned to acid anhydride group was diminished, the absorption at 1,745 cm$^{-1}$ assigned to ester carbonyl group was increased, the absorption assigned to carboxyl carbonyl group appeared slightly at 1,710 to 1,700 cm$^{-1}$ and the absorption assigned to amide carbonyl group appeared at 1,640 cm$^{-1}$.

Then 5.00 g of epoxy resin Araldite GY-260 made by Ciba Co. was added to the above obtained reaction mass in an amount of 1 equivalent of the epoxy group per 1 equivalent of the side chain carboxyl group formed by the ring opening of the acid anhydride group of the trimellitoyl group functional polymer, and the resulting mixture was stirred thoroughly in an oil bath kept at 150°C while defoaming under vacuum to prepare a homogeneous melted reaction mixture. The melted reaction mixture was injected into a metal mold having a thickness of 1 mm and coated with a silicone oil series releasing agent, and heated and cured at 150°C for 3 hours to obtain a light yellowish brown transparent elastomer sheet.

A DIN No. 3 dumbell specimen was prepared from the thus obtained sheet, and the tensile strength, elongation, tear strength, Young's modulus and hardness of the sheet were measured. In this example and the following examples, the above described physical properties were measured according to the following methods.

1. Tensile strength and elongation:
The dumbell specimen is drawn at a rate of 500 mm/min at room temperature by means of a tensile tester.

2. Tear strength:

The dumbell specimen is provided at its middle point and points separated from each side of the middle point by 1.5 mm with three cracks each having a length of 1.5 mm and extending in widthwise direction of the specimen, and the specimen is drawn at a rate of 200 mm/min at room temperature.

3. Young's modulus:

The dumbell specimen is drawn at a rate of 50 mm/min, and the tensile strength at 20% elongation is measured, and the measured value is multiplied by 5, which is Young's modulus.

4. Hardness:

6 dumbell specimens are superposed and the hardness is measured by means of a JIS hardness tester.

The above obtained elastomer sheet had a tensile strength of 66 Kg/cm$^2$, an elongation of 140%, a tear strength of 5.1 Kg/cm, a Young's modulus of 64 Kg/cm$^2$ and a hardness (JIS) of 65. Further, when the above obtained homogeneous melted reaction mixture was injected into another metal mold having a thickness of 1 mm and coated with the releasing agent, and heated and cured at 150° C for 5 hours, the resulting elastomer sheet had a tensile strength of 87 Kg/cm$^2$, an elongation of 120%, a tear strength of 6.5 Kg/cm, a Young's modulus of 72 Kg/cm$^2$ and a hardness (JIS) of 68.

The above used epoxy resin Araldite GY-260 has the following formula VII.

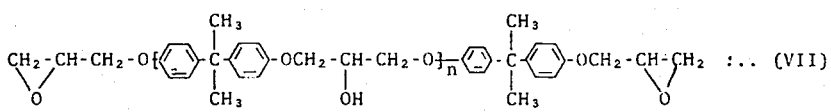

wherein $n$ is about 0.

EXAMPLE 2

In the same procedure as used in Example 1, 16.36 g of the trimellitoyl group functional polymer used in Example 1 and 2.67 g of 3,3'-dichloro-4,4'-diaminodiphenylmethane (the equivalent ratio of the amino group to the acid anhydride group is 1:1) were reacted, and the reaction mass was mixed homogeneously together with epoxy resin Epikote 1001 made by Shell Co. (the equivalent ratio of the epoxy group to the side chain carboxyl group is 1:1 similarly to that in Example 1) while stirring in an oil bath kept at 150° C to obtain a fluid reaction mixture, which was injected into a metal mold having a thickness of 1 mm and coated with a silicone oil series releasing agent, and heated and cured at 150° C for 3 hours. The resulting light yellowish brown transparent tenacious elastomer sheet had physical properties of a tensile strength of 230 Kg/cm$^2$, an elongation of 180%, a tear strength of 10.3 Kg/cm, a Young's modulus of 105 Kg/cm$^2$ and hardness (JIS) of 72. Further, the above obtained fluid reaction mixture was injected into another metal mold having a thickness of 1 mm and coated with the releasing agent, and heated and cured at 150° C for 5 hours to obtain an elastomer sheet, which had physical properties of a tensile strength of 203 Kg/cm$^2$, an elongation of 170%, a tear strength of 12.3 Kg/cm, a Young's modulus of 99.1 Kg/cm$^2$ and a hardness (JIS) of 73.

The above used epoxy resin Epikote 1001 has the formula VII shown in Example 1, wherein n is 2.

EXAMPLE 3

In the same reactor as used in Example 1, 12.27 g of the trimellitoyl group functional polymer used in Example 1 and 2.00 g of 3,3'-dichloro-4,4'-diaminodiphenylmethane (the equivalent ratio is the same as that in Example 1) were reacted in the same procedure as described in Example 1 to obtain a homogeneous melted reaction mass. Then 15.00 g of epoxy resin Epikote 1004 made by Shell Co. was added thereto (the equivalent ratio is the same as that in Example 1), and the resulting mixture was left to stand in an oil bath kept at 150° C for some time. Immediately after the Epikote 1004 was melted, the mass was mixed and stirred under vacuum to remove foam. The resulting melted reaction mixture was immediately injected into a metal mold having a thickness of 1 mm and coated with a silicone oil series releasing agent, and heated and cured at 150° C for 3 hours to obtain a light brown transparent and highly tenacious elastomer sheet. The elastomer sheet had physical properties of a tensile strength of 305 Kg/cm$^2$, an elongation of 150%, a tear strength of 38.5 Kg/cm, a Young's modulus of 428 Kg/cm$^2$ and a hardness (JIS) of 99. Further, the above obtained melted reaction mixture was heated and cured at 150° C for 5 hours in the same manner as described above to obtain a highly tenacious elastomer sheet, which had physical properties of a tensile strength of 285 Kg/cm$^2$, an elongation of 150%, a tear strength of 48.7 Kg/cm, a Young's modulus of 538 Kg/cm$^2$ and a hardness (JIS) of 99.

The above used epoxy resin Epikote 1004 has the formula VII shown in Example 1, wherein $n$ is 3.7.

EXAMPLE 4

In the same reactor as used in Example 1, 9.82 g of the trimellitoyl group functional polymer used in Example 1 and 1.60 g of 3,3'-dichloro-4,4'-diaminodiphenylmethane (the equivalent ratio is the same as that in Example 1) were reacted in the same procedure as described in Example 1 to obtain a homogeneous melted reaction mass, and 25.20 g of epoxy resin Epikote 1007 made by Shell Co. was added thereto (the equivalent ratio is the same as that in Example 1), and the resulting mixture was left to stand in an oil bath kept at 180° C for some time. Immediately after the Epikote 1007 began to melt, the mass was mixed and stirred under vacuum to remove foam, whereby a light brown transparent stringy viscous reaction mixture having poor fluidity was obtained. The thus obtained reaction mixture was injected into a metal mold having a thickness of 1 mm and coated with a silicone oil series releasing agent, and heated and cured at 150° C for 3 hours to obtain a highly tenacious elastomer resin. The elastomer resin had physical properties of a tensile strength of 420 Kg/cm$^2$, an elongation of 10%, a tear strength of 131 Kg/cm and a hardness (JIS) of higher than 100. Further, when the curing treatment is effected at 150° C for 5 hours, the resulting elastomer resin had physical properties of a tensile strength of 471 Kg/cm$^2$, an elongation of 10%, a tear strength of 148 Kg/cm and a hardness (JIS) of higher than 100.

The above used epoxy resin Epikote 1007 has the formula VII shown in Example 1, wherein n is 8.8.

EXAMPLES 5 TO 7

The trimellitoyl group functional polymer used in Example 1 and 3,3'-dichloro-4,4'-diaminodiphenylmethane were reacted in the same procedure as described in Example 1, and the reaction mass was treated with a blend of Araldite GY-260 and Epikote 1004 as an epoxy resin component in the same manner as described in Example 1 to prepare a elastomer sheet having a thickness of 1 mm. Physical properties of the resulting sheets are shown in the following Table 1.

described in Example 1 and the reaction mass was treated with the epoxy resins used in Examples 1 to 4 respectively, and then cured in metal molds having a thickness of 1 mm in the same procedures described in Examples 1 to 4 to obtain highly flexible elastomer sheets or elastomer resin sheets. Physical properties of these elastomer sheets are shown in the following Table 2.

Table 1

| Example | 5 | | 6 | | 7 | |
|---|---|---|---|---|---|---|
| Equivalent ratio of GY-260/Epikote 1004 | 75/25 | | 50/50 | | 25/75 | |
| Trimellitoyl group functional polymer (g) | 18.00 | | 16.36 | | 16.36 | |
| 3,3'-Dichloro-4,4'-diaminodiphenylmethane (g) | 2.94 | | 2.67 | | 2.67 | |
| GY-260 (g) | 3.30 | | 2.00 | | 1.00 | |
| Epikote 1004 (g) | 5.50 | | 10.00 | | 15.00 | |
| Curing condition 150°C × hr | 3 | 5 | 3 | 5 | 3 | 5 |
| Tensile strength (Kg/cm$^2$) | 180 | 200 | 312 | 297 | 333 | 322 |
| Elongation (%) | 180 | 180 | 190 | 190 | 210 | 200 |
| Tear strength (Kg/cm) | 10.4 | 10.2 | 17.2 | 18.1 | 27.7 | 25.4 |
| Young's modulus (Kg/cm$^2$) | 80 | 83 | 116 | 146 | 258 | 268 |
| Hardness (JIS) | 78 | 80 | 90 | 93 | 94 | 98 |

In the above Table 1, the physical properties were determined according to the method described in Example 1, and the compounding ratio of the components is the same as that in Example 1.

Table 2

| Example | 8 | | 9 | | 10 | | 11 | |
|---|---|---|---|---|---|---|---|---|
| Trimellitoyl group functional polymer (g) | 22.52 | | 20.27 | | 15.76 | | 13.51 | |
| 3,3'-Dichloro-4,4'-diaminodiphenylmethane (g) | 2.67 | | 2.40 | | 1.87 | | 1.60 | |
| GY-260 (g) | 4.00 | | | | | | | |
| Epikote 1001 (g) | | | 9.00 | | | | | |
| Epikote 1004 (g) | | | | | 14.00 | | | |
| Epikote 1007 (g) | | | | | | | 25.20 | |
| Curing condition 150°C × hr | 3 | 5 | 3 | 5 | 3 | 5 | 3 | 5 |
| Tensile strength (Kg/cm$^2$) | 22 | 39 | 147 | 143 | 170 | 185 | 261 | 290 |
| Elongation (%) | 430 | 450 | 330 | 350 | 270 | 250 | 240 | 250 |
| Tear strength (Kg/cm) | 1.5 | 1.5 | 5.0 | 3.9 | 8.1 | 9.0 | 43.6 | 51.0 |
| Young's modulus (Kg/cm$^2$) | 8.2 | 9.2 | 17.6 | 26.2 | 40.9 | 35.9 | 479 | 526 |
| Hardness (JIS) | 13 | 25 | 48 | 50 | 55 | 58 | 89 | 97 |

EXAMPLES 8 TO 11

In the same reactor as used in Example 1, a trimellitoyl group functional polymer, which was prepared from polytetramethylene ether glycol having a number average molecular weight of 1500 (made by Nippon Polyurethane Kogyo Co.) and trimellitic anhydride monochloride in the same procedure as described in Example 1, was firstly reacted with 3 3'-dichloro-4,4'-diaminodiphenylmethane in the same procedure as

EXAMPLES 12 TO 14

The trimellitoyl group functional polymer used in Examples 8 to 11 was reacted with 3,3'-dichloro-4,4'-diaminodiphenylmethane in the same procedure as described in Example 1, and the reaction mass was added with a blend of Araldite GY-260 and Epikote 1004 as an epoxy resin component, and heated and cured to obtain a light yellowish brown transparent and highly flexible elastomer. Physical properties of the resulting elastomers are shown in the following Table 3.

Table 3

| Example | 12 | | 13 | | 14 | |
|---|---|---|---|---|---|---|
| Equivalent ratio of GY-260/Epikote 1004 | 75/25 | | 50/50 | | 25/75 | |
| Trimellitoyl group functional polymer (g) | 20.30 | | 20.30 | | 20.30 | |
| 3,3'-Dichloro-4,4'-diaminodiphenylmethane (g) | 2.40 | | 2.40 | | 2.40 | |
| GY-260 (g) | 2.70 | | 1.20 | | 0.90 | |
| Epikote 1004 (g) | 4.50 | | 9.00 | | 13.50 | |
| Curing condition 150°C × hr | 3 | 5 | 3 | 5 | 3 | 5 |
| Tensile strength (Kg/cm$^2$) | 42 | 37 | 92 | 110 | 200 | 158 |

Table 3-continued

| Example | 12 | | 13 | | 14 | |
|---|---|---|---|---|---|---|
| Equivalent ratio of GY-260/Epikote 1004 | 75/25 | | 50/50 | | 25/75 | |
| Elongation (%) | 340 | 310 | 280 | 270 | 270 | 260 |
| Tear strength (Kg/cm) | 2.9 | 3.4 | 5.4 | 5.3 | 6.8 | 7.9 |
| Young's modulus (Kg/cm$^2$) | 25 | 21 | 39 | 38 | 45 | 46 |
| Hardness (JIS) | 48 | 48 | 60 | 60 | 64 | 64 |

In the above Table 3, the physical properties were determined according to the method described in Example 1, and the compounding ratio of the components is the same as that in Example 1.

EXAMPLES 15 TO 18

In the same reactor as used in Example 1, a trimellitoyl group functional polymer prepared from polytetramethylene ether glycol having a number average molecular weight of 2076 (made by Nippon Polyurethane Kogyo Co.) and trimellitic anhydride monochloride in the same procedure as described in Example 1 was reacted with 3,3'-dichloro4,4'-diaminodiphenylmethane and epoxy resins under the same compounding conditions and procedures as described in Examples 1 to 4. That is, the above described trimellitoyl group functional polymer was firstly reacted with 3,3'-dichloro-4,4'-diaminodiphenylmethane, and the resulting mass was mixed with an epoxy resin, and heated and cured. The resulting sheets were light brown transparent tenacious elastomers. When an epoxy resin having a high epoxy equivalent is used, the resulting elastomer has a remarkably high tenacity. Physical properties of the resulting elastomer sheets are shown in the following Table 4.

Table 4

| Example | 15 | | 16 | | 17 | | 18 | |
|---|---|---|---|---|---|---|---|---|
| Trimellitoyl group functional polymer (g) | 22.47 | | 18.51 | | 15.86 | | 10.58 | |
| 3,3'-Dichloro-4,4'-diaminodiphenylmethane (g) | 2.27 | | 1.87 | | 1.60 | | 1.07 | |
| GY-260 (g) | 3.40 | | | | | | | |
| Epikote 1001 (g) | | | 7.00 | | | | | |
| Epikote 1004 (g) | | | | | 12.00 | | | |
| Epikote 1007 (g) | | | | | | | 16.80 | |
| Curing condition 150°C × hr | 3 | 5 | 3 | 5 | 3 | 5 | 3 | 5 |
| Tensile strength (Kg/cm$^2$) | 43 | 34 | 39 | 48 | 219 | 166 | 342 | 286 |
| Elongation (%) | 230 | 160 | 230 | 220 | 290 | 270 | 210 | 210 |
| Tear strength (kg/cm) | 2.8 | 3.3 | 3.7 | 3.8 | 5.8 | 7.0 | 28.4 | 33.9 |
| Young's modulus (Kg/cm$^2$) | 17.3 | 21.0 | 32.2 | 27.6 | 38.5 | 38.1 | 231 | 286 |
| Hardness (JIS) | 41 | 48 | 48 | 51 | 51 | 57 | 82 | 93 |

EXAMPLES 19 TO 21

The trimellitoyl group functional polymer used in Examples 15 to 18 was reacted with 3,3'-dichloro-4,4'-diaminodiphenylmethane in the same procedure as described in Example 1. The reaction mass was added with a blend of Araldite GY-260 and Epikote 1004 as an epoxy resin, and heated and cured to obtain a light brown transparent tenacious elastomer. Physical properties of the resulting elastomers are shown in the following Table 5. As seen from Table 5, as the ratio of Epikote 1004 having a high epoxy equivalent, is increased, the tenacity of the resulting elastomer increases.

Table 5

| Example | 19 | | 20 | | 21 | |
|---|---|---|---|---|---|---|
| Equivalent ratio of GY-260/Epikote 1004 | 75/25 | | 50/50 | | 25/75 | |
| Trimellitoyl group functional polymer (g) | 23.49 | | 23.49 | | 18.27 | |
| 3,3'-Dichloro-4,4'-diaminodiphenylmethane (g) | 2.40 | | 2.40 | | 1.87 | |
| GY-260 (g) | 2.70 | | 1.20 | | 0.70 | |
| Epikote 1004 (g) | 4.50 | | 9.00 | | 10.50 | |
| Curing condition 150°C × hr | 3 | 5 | 3 | 5 | 3 | 5 |
| Tensile strength (Kg/cm$^2$) | 40 | 40 | 54 | 49 | 108 | 130 |
| Elongation (%) | 310 | 280 | 230 | 230 | 280 | 260 |
| Tear strength (Kg/cm) | 3.3 | 2.8 | 4.4 | 5.2 | 6.4 | 5.6 |
| Young's modulus (Kg/cm$^2$) | 24 | 30 | 37 | 34 | 44 | 42 |
| Hardness (JIS) | 54 | 54 | 58 | 60 | 60 | 62 |

In the above Table 5, the physical properties were determined according to the method described in Example 1, and the compounding ratio of the components is the same as that in Example 1.

EXAMPLES 22 TO 26

Sheets were produced under the exactly same compounding conditions as described in Examples 1, 3 and 5 to 7, except that a trimellitoyl group functional polymer A prepared from polytetramethylene ether glycol having a number average molecular weight of 1058 (made by Nippon Polyurethane Kogyo Co.) and trimellitic anhydride monochloride in the same procedure as described in Example 1, and a trimellitoyl group functional polymer B prepared from polytetramethylene ether glycol having a number average molecular weight of 2076 (made by Nippon Polyurethane Kogyo Co.) and trimellitic anhydride monochloride in the same procedure as described in Example 1 were blended in an equivalent ratio of 50:50, and the resulting blend was used as the acid anhydride group component. The obtained sheets were light brown transparent and highly flexible elastomers. Further, as the ratio of an epoxy resin having a high epoxy equivalent (Epikote 1004) in the epoxy resin component is higher, the resulting sheet has a higher tenacity, and nevertheless the sheet is an elastomer having a high elongation. Physical properties of the resulting sheets are shown in the following Table 6.

strength as the sheet obtained in Example 17, but was inferior in the elongation. The above obtained sheet had physical properties of a tensile strength of 158 Kg/cm$^2$, an elongation of 150% and a tear strength of 6.5 Kg/cm.

COMPARATIVE EXAMPLE 2

The experiment of Example 15 was effected without using the diamine component. That is the trimellitoyl group functional polymer and Araldite GY-260 as an epoxy resin were melted and mixed homogeneously in an equivalent ratio of 1:1 in an oil bath kept at 80°C by using the same reactor as used in Example 1, and the resulting mixture was injected into a metal mold having a thickness of 1 mm and heated and cured at 150°C for 3 hours and 5 hours respectively to obtain elastomer sheets. The resulting elastomer sheets were considerably inferior in the elongation to the elastomer sheets obtained in Example 15. Physical properties of the above obtained sheets are as follows.

Table 6

| Example | 22 | | 23 | | 24 | | 25 | | 26 | |
|---|---|---|---|---|---|---|---|---|---|---|
| Equivalent ratio of GY-260/Epikote 1004 | 100/0 | | 75/25 | | 50/50 | | 25/75 | | 0/100 | |
| Trimellitoyl group functional polymer A (g) | 8.80 | | 7.33 | | 7.36 | | 7.36 | | 5.70 | |
| Trimellitoyl group functional polymer B (g) | 14.50 | | 12.10 | | 11.74 | | 11.74 | | 9.10 | |
| 3,3'-Dichloro-4,4'-diaminodiphenylmethane (g) | 3.29 | | 2.67 | | 2.40 | | 2.40 | | 1.87 | |
| GY-260 (g) | 4.80 | | 3.00 | | 1.20 | | 0.90 | | | |
| Epikote 1004 (g) | | | 5.00 | | 9.00 | | 13.50 | | 14.00 | |
| Curing condition 150°C × hr | 3 | 5 | 3 | 5 | 3 | 5 | 3 | 5 | 3 | 5 |
| Tensile strength (Kg/cm$^2$) | 43 | 46 | 63 | 42 | 178 | 179 | 253 | 257 | 294 | 321 |
| Elongation (%) | 300 | 290 | 250 | 230 | 270 | 250 | 290 | 280 | 270 | 240 |
| Tear strength (Kg/cm) | 2.7 | 3.3 | 4.4 | 4.2 | 6.7 | 7.4 | 9.0 | 9.4 | 16.7 | 19.8 |
| Young's modulus (Kg/cm$^2$) | 22 | 25 | 33 | 32 | 43 | 43 | 49 | 48 | 108 | 112 |
| Hardness (JIS) | 50 | 52 | 57 | 54 | 66 | 65 | 68 | 68 | 84 | 90 |

As seen from the above described experiments, elastomers having various physical properties and elastomer resins having flexibility can be easily obtained by changing optionally the average molecular weight of the acid anhydride group functional polymer i.e., the ratio of the soft components, or the structure of the epoxy resin, i.e., the hard component.

| Curing time (hr) | Tensile strength (Kg/cm$^2$) | Elongation (%) | Tear strength (Kg/cm) |
|---|---|---|---|
| 3.0 | 24.0 | 53 | 2.1 |
| 5.0 | 23.9 | 46 | 2.1 |

COMPARATIVE EXAMPLE 1

The experiment of Example 17 was effected without using the diamine component. That is, the trimellitoyl group functional polymer and Epikote 1004 as an epoxy resin were melted and mixed homogeneously in an equivalent ratio of the acid anhydride group:epoxy group = 0.85:1.00 in an oil bath kept at 150°C by using the same reactor as used in Example 1, and then the resulting mixture was injected into a metal mold having a thickness of 1 mm, and heated and cured at 150°C for 3 hours. The resulting sheet was a light yellow transparent elastomer. This sheet had the same tensile

EXAMPLES 27 TO 29

The components used in Example 1 were compounded and reacted under the exactly same compounding condition as described in Example 1, except that diamines described in the following Table 7 were used as the diamine component. The reaction mixture was injected into a metal mold having a thickness of 1 mm. and heated and cured at 150°C for 3 hours and 5 hours respectively. The resulting sheets were all transparent and highly flexible elastomers having yellowish brown or brown color. Physical properties of the sheets are shown in Table 7.

Table 7

| Example | 27 | | 28 | | 29 | |
|---|---|---|---|---|---|---|
| Diamine | 4,4'-Diamino-diphenylmethane | | 4,4'-Diamino-diphenyl ether | | 3,3'-Diamino-diphenyl sulfone | |
| Curing condition 150°C × hr | 3 | 5 | 3 | 5 | c | 5 |
| Tensile strength (Kg/cm²) | 86 | 78 | 96 | 93 | 72 | 80 |
| Elongation (%) | 240 | 290 | 600 | 520 | 320 | 300 |
| Tear strength (Kg/cm) | 5.7 | 5.5 | 7.8 | 7.6 | 4.9 | 5.3 |
| Young's modulus (Kg/cm²) | 65 | 69 | 48 | 48 | 47 | 53 |
| Hardness (JIS) | 69 | 64 | 46 | 50 | 42 | 47 |

As seen from Table 7, elastomers having an excellent elongation can be obtained by using diamines having ether linkage.

EXAMPLES 30 TO 35

Into the same reactor as used in Example 1, a trimellitoyl group functional polymer prepared from polytetramethylene ether glycol having a number average molecular weight of 2000 (made by Dai Nippon Ink Co.) and trimellitic anhydride monochloride in the same procedure as described in Example 1 was reacted with a dicarboxylic acid dihydrazide shown in the following Table 8, which was used in place of the diamine, in a ratio of 1 equivalent of the hydrazide group per 1 equivalent of the acid anhydride group functional polymer in an oil bath kept at 150° to 180° C to obtain a melted homogeneous reaction product having relatively low fluidity, which had carboxyl groups in the side chain bonded to a chain extended by the diacylhydrazine linkage. (In this reaction, when aliphatic dicarboxylic acid dihydrazide having a methylene chain number which is apt to cause selfcyclization, it is preferable to effect the reaction at a temperature lower than the melting point of the dihydrazide and in a short reaction time as far as possible. As the result, separation of a self-cyclization product can be prevented and a homogeneous reaction product can be obtained. However, when aliphatic dicarboxylic acid dihydrazide having a long methylene chain which does not cause self cyclization or carbohydrazide is used, a homogeneous reaction product can be obtained by stirring and mixing thoroughly the reaction mixture at a temperature higher than the melting point of the hydrazide.) An infrared absorption spectrum of the reaction product was measured by using a potassium bromide crystal plate. The spectrum showed that the absorption at 1,850 cm$^{-1}$ assigned to acid anhydride group was diminished, the absorption assigned to carbonyl group of diacylhydrazine linkage newly appeared at 1,640 cm$^{-1}$ and only one absorption appeared at 3,340 cm$^-$, which is assigned to secondary amino group.

Then, the above obtained reaction product was mixed thoroughly with an epoxy resin in a ratio of 1 equivalent of the epoxy group per 1 equivalent of the side chain carboxyl group under stirring in an oil bath kept at 150° C, and the resulting mixture was injected into a metal mold having a thickness of 1 mm, and heated and cured at 150° C for 3 hours and 5 hours respectively to obtain highly flexible elastomers or tenacious elastomer resins. Elastomers obtained by using dicarboxylic acid dihydrazide are more flexible and less in coloring than elastomers obtained by using aromatic diamine. Physical properties of the resulting elastomer sheets are shown in the following Table 8.

Table 8

| Example | 30 | | 31 | | 32 | | 33 | | 34 | | 35 | |
|---|---|---|---|---|---|---|---|---|---|---|---|---|
| Dicarboxylic acid dihydrazide | Adipic acid dihydrazide | | Sebacic acid dihydrazide | | Sebacic acid dihydrazide | | Isophthalic acid dihydrazide | | Isophthalic acid dihydrazide | | Piperazine-N-N'-diacetic acid dihydrazide | |
| Epoxy resin | GY-260 | | GY-260 | | Epikote 1004 | | GY-260 | | Epikote 1004 | | GY-260 | |
| Curing condition 150°C × hr | 3 | 5 | 3 | 5 | 3 | 5 | 3 | 5 | 3 | 5 | 3 | 5 |
| Tensile strength (Kg/cm²) | 21 | 30 | 38 | 36 | 86 | 92 | 32 | 28 | 98 | 103 | 35 | 38 |
| Elongation (%) | 150 | 180 | 240 | 310 | 300 | 270 | 505 | 430 | 360 | 320 | 200 | 180 |
| Tear strength (Kg/cm) | 5.9 | 6.2 | 3.7 | 3.0 | 6.8 | 6.4 | 2.9 | 4.0 | 7.3 | 6.8 | 5.5 | 6.2 |
| Young's modulus (Kg/cm²) | 34 | 48 | 35 | 46 | 51 | 54 | 13 | 15 | 32 | 46 | 43 | 46 |
| Hardness (JIS) | 67 | 64 | 52 | 54 | 63 | 62 | 41 | 43 | 45 | 46 | 62 | 60 |

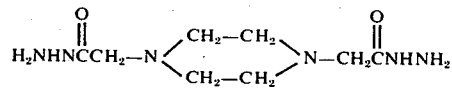

EXAMPLES 36 TO 38

A trimellitoyl group functional polymer A prepared from polytetramethylene ether glycol having a number average molecular weight of 1058 (made by Nippon Polyurethane Kogyo Co.) and trimellitic anhydride monochloride, or a trimellitoyl group functional polymer B prepared from polytetramethylene ether glycol having a number average molecular weight of 2000 (made by Dai Nippon Ink Co.) and trimellitic anhydride monochloride in the same procedure as described in Example 1, or a blend thereof was reacted with sebacic acid dihydrazide by using the same reactor as used in Example 1 in the same procedure as described in Examples 30 to 35, and the reaction mass was added with Araldite GY-260 or Epikote 1004 alone or a blend thereof as an epoxy resin and then formed into sheets. Physical properties of the resulting sheets are shown in the following Table 9.

Table 9

| Example | 36 | | 37 | | 38 | |
|---|---|---|---|---|---|---|
| Equivalent ratio of trimellitoyl group functional polymer A/B | 100/0 | | 50/50 | | 0/100 | |
| Equivalent ratio of GY-260/Epikote 1004 | 0/100 | | 100/0 | | 50/50 | |
| Curing condition 150°C × hr | 3 | 5 | 3 | 5 | 3 | 5 |
| Tensile strength (Kg/cm$^2$) | 338 | 264 | 30 | 38 | 64 | 96 |
| Elongation (%) | 240 | 180 | 240 | 160 | 320 | 230 |
| Tear strength (Kg/cm) | 74.1 | 60 | 3.7 | 4.2 | 5.0 | 6.2 |
| Young's modulus (Kg/cm$^2$) | 573 | 794 | 36 | 51 | 31 | 46 |
| Hardness (JIS) | 99 | 99 | 57 | 60 | 58 | 66 |

EXAMPLES 39 TO 43

A trimellitoyl group functional polymer prepared from the polytetramethylene ether glycol having a number average molecular weight of 2000 (made by Dai Nippon Ink Co.) used in Examples 30 to 35 and trimellitic anhydride monochloride was reacted with carbohydrazide in a ratio of 1 equivalent of the hydrazide group per 1 equivalent of the trimellitoyl group in the same procedure as described in Example 30. The reaction mass was added with Araldite GY-260 or Epikote 1004 aloneor a alone or thereof as an epoxy resin, and then formed into sheets. Physical properties of the sheets are shown in the following Table 10.

EXAMPLE 45

A sheet was prepared in the exactly same procedure as described in Example 6, except that the trimellitoyl group functional polymer, 3,3'-dichloro-4,4'-diaminodiphenylmethane, Araldite GY-260 and Epikote 1004 were added simultaneously and mixed under stirring. The sheet obtained by heating and curing at 150°C for 3 hours was a light brown transparent elastomer having physical properties of a tensile strength of 239 Kg/cm$^2$, an elongation of 210%, a tear strength of 11.9 Kg/cm, a Young's modulus of 775 Kg/cm$^2$ and a hardness (JIS) of 90. That is, the sheet obtained in this Example 45 is somewhat inferior to the sheet obtained Table 10

| Example | 39 | | 40 | | 41 | | 42 | | 43 | |
|---|---|---|---|---|---|---|---|---|---|---|
| Equivalent ratio of GY-260/Epikote 1004 | 100/0 | | 75/25 | | 50/50 | | 25/75 | | 0/100 | |
| Curing condition 150°C × hr | 3 | 5 | 5 | 7 | 5 | 7 | 5 | 7 | 5 | 7 |
| Tensile strength (Kg/cm$^2$) | 19 | 35 | 70 | 62 | 123 | 131 | 156 | 131 | 178 | 164 |
| Elongation (%) | 800 | 550 | 290 | 260 | 350 | 300 | 400 | 350 | 400 | 400 |
| Tear strength (Kg/cm) | 1.2 | 1.9 | 3.9 | 4.4 | 6.1 | 6.9 | 4.4 | 4.9 | 7.2 | 8.0 |
| Young's modulus (Kg/cm$^2$) | 3.8 | 10 | 32 | 42 | 42 | 58 | 47 | 50 | 32 | 37 |
| Hardness (JIS) | 12 | 25 | 50 | 50 | 49 | 60 | 52 | 50 | 50 | 50 |

As seen from Table 10, when the kind and compounding ratio of epoxy resins in the epoxy resin component are varied, elastomers having various properties, i.e., highly soft elastomers or tenacious and soft elastomers can be easily obtained.

EXAMPLE 44

A trimellitoyl group functional polymer prepared from polytetramethylene ether glycol having a number average molecular weight of 6000 (made by Nippon Polyurethane Kogyo Co.) and trimellitic anhydride monochloride in the same procedure as described in Example 1 was treated with 3,3'-dichloro-4,4'-diaminodiphenylmethane and Araldite GY-260 as an epoxy resin to prepare a sheet. In this case, a transparent fluid reaction mixture before adding the epoxy resin was changed into an opaque fluid reaction mixture by adding the epoxy resin, and just after heating and curing the opaque fluid reaction mixture at 150°C for 5 hours, the resulting sheet was a highly soft elastomer, but after left to stand the sheet for about 10 days at room temperature, the sheet became very tenacious and had physical properties of a tensile strength of 177 Kg/cm$^2$, an elongation of 600%, a tear strength of 16.9 Kg/cm, a Young's modulus of 263 Kg/cm$^2$ and a hardness (JIS) of 90.

in Example 6 in the physical properties. This is probably due to the reason that the physical properties of elastomer sheet are influenced by the regularity in the structure of the sheet.

EXAMPLE 46

A hydroxyl group functional polybutadiene having an average molecular weight of 1504, which was obtained by ozonizing commercially available cis-polybutadiene BROI having a number average molecular weight of about 110,000 (made by Nippon Gosei Gomu Co.) and then subjecting the resulting ozonide to reduction and cleavage by means of lithium aluminum hydride (LiAlH$_4$), was reacted with trimellitic anhydride monochloride in an equivalent ratio of 1:1 in the same procedure as described in Example 1 to prepare a trimellitoyl group functional polymer. The resulting trimellitoyl group functional polymer was treated with 3,3'-dichloro-4,4'-diaminodiphenylmethane and Araldite GY-260 as an epoxy resin under the same compounding condition and procedure as described in Example 1 to prepare a sheet. The sheet obtained by the curing treatment at 150°C for 3 hours was an opaque and highly elastic sheet, and had physical properties of a tensile strength of 78 Kg/cm$^2$, an elongation of 320%, a tear strength of 5.8 KG/cm, a Young's modulus of 43 Kg/cm² and a hardness (JIS) of 52.

EXAMPLE 47

A sheet was prepared in the exactly same procedure and compounding condition as described in Example 46, except using a trimellitoyl group functional polymer obtained by reacting a hydroxyl group functional polyisoprene having an average molecular weight of 3480, which was obtained by ozonizing commercially available polyisoprene rubber Natsyn 2200 having a number average molecular weight of 398,000 (made by Goodyear Co.) and then subjecting the resulting ozonide to reduction and cleavage by means of LiAlH₄, with trimellitic anhydride monochloride in an equivalent ratio of 1:1, and Epikote 1004 as an epoxy resin. The resulting sheet was a yellowish brown opaque elastomer.

EXAMPLE 48

A sheet was prepared in the exactly same procedure and compounding condition as described in Example 1, except that Shodyne 508 (made by Showa Denko Co.) having the following structural formula was used as an epoxy resin.

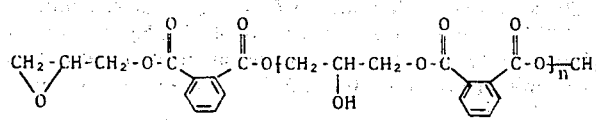

(epoxy equivalent: 200)

The sheet obtained after curing at 150°C for 3 hours was a very soft elastomer, and had a tensile strength of 42 Kg/cm², an elongation of 530% and a tear strength of 2.5 Kg/cm.

EXAMPLE 49

A sheet A was prepared in the exactly same procedure and compounding condition as described in Example 1, except that a trimellitoyl group functional polymer prepared from polypropylene ether glycol having a number average molecular weight of 200 (made by Sanyl Kasei Co.) and trimellitic anhydride monochloride was used.

Further, a sheet B was prepared in the following way. When the epoxy resin Araldite GY-260 was added to the reaction system in the production of the sheet A, 1 equivalent of phthalic anhydride based on 1 equivalent of trimellitoyl group functional polymer was added to the reaction system together with another 1 equivalent of epoxy resin Araldite GY-260, i.e. 2 equivalents of Araldite GY-260. Both of the resulting sheets A and B were light yellowish brown transparent elastomers, but the sheet B was somewhat hazy. Further, the sheet B was more tenacious than the sheet A. Physical properties of the sheets A and B are as follows.

|  | Tensile strength (Kg/cm²) | Elongation (%) | Tear strength (Kg/cm) | Young's modulus (Kg/cm²) | Hardness (JIS) |
|---|---|---|---|---|---|
| Sheet A | 13.9 | 220 | 1.4 | 8.5 | 25 |
| Sheet B | 35.6 | 200 | 2.5 | 29 | 48 |

It can be seen from the above table that the lower molecular weight acid anhydride has a reinforcing effect.

EXAMPLE 50

A trimellitoyl group functional polymer prepared from polypropylene ether glycol having a number average molecular weight of 400 (made by Sanyo Kasei Co.) and trimellitic anhydride monochloride in the same procedure as described in Example 1 was mixed with malamine in an equivalent ratio of 1.1:1.0, and the resulting mixture was heated and stirred in an oil bath kept at 150°C. Particles of the melamine were melted and the viscosity of the system was gradually increased. After one hour heating, the reaction mass was sampled on a potassium bromide crystal plate, and its infrared absorption spectrum was measured. It was confirmed from the spectrum that the absorption at 1,850 cm⁻¹ assigned to acid anhydride group was considerably decreased. Then, the reaction mass was mixed with epoxy resin Araldite GY-260 in an amount of 1 equivalent of the epoxy resin per 1 equivalent of the trimellitoyl group functional polymer under vigorous stirring, and the resulting mixture was injected into a metal mold having a thickness of 1 mm, and heated and cured at 150°C for 3 hours to prepare a sheet. The resulting sheet was an elastic and tenacious resin.

EXAMPLES 51 and 52

Three components of a trimellitoyl group functional polymer prepared from commercially available polybutadiene glycol R-45M having a number average molecular weight of 2500 (made by ARCO Chemical Co.) and trimellitic anhydride monochloride in the same procedure as described in Example 1, 3,3'-dichloro-4,4'-diaminodiphenylmethane and an epoxy resin shown in the following Table 11 were mixed simultaneously while stirring under the same compounding condition as described in Example 45, and the reaction mixture was heated and cured at 150°C for 3 hours in a metal mold having a thickness of 1 mm to prepare a sheet. The resulting sheets were light brown opaque elastomers. Physical properties of the sheets are shown in Table 11.

Table 11

| Example Epoxy resin | 51 GY-260 | 52 Epikote 1004 |
|---|---|---|
| Tensle strength (Kg/cm²) | 32 | 196 |
| Elongation (%) | 180 | 200 |
| Tear strength (Kg/cm) | 2.2 | 5.7 |
| Young's modulus (Kg/cm²) | 42 | 119 |
| Hardness (JIS) | 69 | 78 |

EXAMPLE 53

A hydroxyl group functional polybutadiene having an average molecular weight of 2100, which was obtained by ozonizing commercially available cis-polybutadiene BR01 having a number average molecular weight of about 110,000 (made by Nippon Gosei Gomu Co.) and then subjecting the ozonide to reduction and cleavage means of sodium bis(2-methoxyethoxy)aluminum hydride[NaAlH₂(OCH₂CH₂OCH₃)₂], was reacted with trimellitic anhydride monochloride in an equivalent ratio of 1.0:1.0 in the same procedure as described in Example 1 to prepare a trimellitoyl group functional polymer. The resulting trimellitoyl group functional polymer was treated with 3,9-bis(2-hydrazide-ethyl)-2,4,8,10-tetraoxaspiro[5,5]undecane, which has the following formula

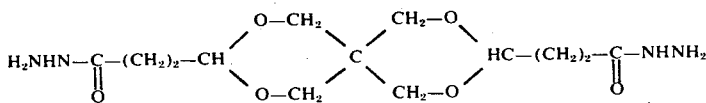

and a melting point of 150° to 156°C and is white crystal, and Araldite GY-260 as an epoxy resin under the same compounding condition and procedure as described in Example 1 to prepare a sheet. The sheet obtained after curing at 150°C for 3 hours was a light brown transparent and highly elastic rubber sheet, and had physical properties of a tensile strength of 90.7 Kg/cm$^2$, an elongation of 140%, a tear strength of 15.7 Kg/cm and a Young's modulus of 282 Kg/cm$^2$. It has been found that the use of the above described chain extender improves the physical properties of the resulting rubber sheet. Moreover, the chain extender is superior to other dicarboxylic acid dihydrazides in the workability.

EXAMPLES 54 and 55

Rubber sheets were prepared by using the exactly same chain extender and cross-linking agent as used in Example 53 under the exactly same compounding condition as described in Example 53, except using a trimellitoyl group functional polymer prepared from polytetramethylene ether glycol having a number average molecular weight shown in the following Table 12 (made by Nippon Polyurethane Kogyo Co.) and trimellitic anhydride monochloride in the same procedure as described in Example 1. Physical properties of the resulting rubber sheets are shown in Table 12 together with the number average molecular weights of the starting glycols.

Table 12

| Example | 54 | 55 |
|---|---|---|
| Number average molecular weight of polytetramethylene ether glycol | 2,074 | 3,506 |
| Tensile strength (Kg/cm$^2$) | 69 | 260 |
| Elongation (%) | 380 | 600 |
| Tear strength (Kg/cm) | 4.8 | 6.4 |
| Young's modulus (Kg/cm$^2$) | 38 | 39 |
| Hardness (JIS) | 55 | 48 |

As seen from Table 12, when dicarboxylic acid dihydrazides having a spiro ring are used as a chain extender, the mechanical strength of the resulting rubber sheet is higher than the case when diamine series chain extenders are used.

EXAMPLE 56

A rubber sheet was prepared under the exactly same compounding condition and vulcanization condition as described in Example 55, except that m-aminobenzoic acid hydrazide was used as a chain extender. The resulting rubber sheet was a brown transparent and very soft elastic body, and had physical properties of a tensile strength of 40 Kg/cm$^2$, an elongation of 650%, a tear strength of 3.8 Kg/cm, a Young's modulus of 14 Kg/cm$^2$ and a hardness (JIS) of 36.

What is claimed is:

1. A method for producing elastomer resins which comprises
   reacting at least one acid anhydride group functional polymer having the following formula

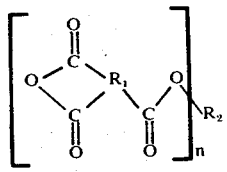

wherein $R_1$ is a trivalent group having at least two carbon atoms, $R_2$ is a hydroxyl group functional polymer residue and $n$ is an integer of at least 2, which is prepared by reacting a hydroxyl group functional polymer having a number average molecular weight of 400 to 10,000 and containing at least two hydroxyl groups at the ends or the side chains with a tricarboxylic acid anhydride monohalide,
   with at least one bifunctional nitrogen compound having primary amino groups as a chain extender at an equivalent ratio of said acid anhydride group to nitrogen group of 1:1
   at a temperature of 40°–200°C to form a carboxyl-functional polymer and
   then reacting said carboxyl-functional polymer with at least one epoxy resin having at least two epoxy groups.
2. The method as claimed in claim 1, wherein said reaction is carried out together with at least one of aliphatic, alicyclic and aromatic low molecular weight acid anhydrides having a molecular weight of less than 400 and containing at least one acid anhydride group.
3. The method as claimed in claim 1, wherein said hydroxyl group functional polymer is
   polybutadiene glycol,
   polyisoprene glycol,
   polyethylene glycol,
   polypropylene glycol or
   polytetramethylene glycol.
4. The method as claimed in claim 1, wherein said tricarboxylic acid anhydride monohalide is trimellitic anhydride monohalide.
5. The method as claimed in claim 1, wherein said bifunctional nitrogen compound having primary amino groups is 3,3'-dichloro-4,4'-diaminodiphenylmethane, 4,4'-diaminodiphenyl ether, adipic acid dihydrazide, sebacic acid dihydrazide, isophthalic acid dihydrazide, piperazine-N,N'-diacetic acid dihydrazide, 3,3'-diaminodiphenyl sulfone, 4,4'-diaminodiphenylmethane, melamine, carbohydrazide, m-aminobenzoic acid or 3,9-bis(2-hydrazideethyl)-2,4,8,10-tetraoxaspiro[5,5]undecane.
6. The method as claimed in claim 1, wherein said epoxy resin is derivatives of bis-phenol A and phthalic acid.
7. The method as claimed in claim 2, wherein said low molecular weight acid anhydride is phthalic anhydride, hexahydrophthalic anhydride or maleic anhydride.

* * * * *